United States Patent [19]

Janowicz

[11] Patent Number: 4,722,984

[45] Date of Patent: Feb. 2, 1988

[54] PENTACYANOCOBALTATE(II) CATALYTIC CHAIN TRANSFER AGENTS FOR MOLECULAR WEIGHT CONTROL IN FREE RADICAL POLYMERIZATION

[75] Inventor: Andrew H. Janowicz, Wilmington, Del.

[73] Assignee: E. I. Du Pont de Nemours and Company, Wilmington, Del.

[21] Appl. No.: 916,925

[22] Filed: Oct. 14, 1986

Related U.S. Application Data

[63] Continuation-in-part of Ser. No. 804,135, Dec. 3, 1985, abandoned.

[51] Int. Cl.$^4$ ............................. C08F 2/40; C08F 20/14
[52] U.S. Cl. ................................. 526/123; 526/135; 526/171; 526/172; 526/328; 526/328.5
[58] Field of Search ................... 526/123, 171, 172

[56] References Cited

U.S. PATENT DOCUMENTS 2,383,425  8/1945  Stewart ............................ 526/93
4,526,945  7/1985  Carlson et al. .................. 526/172

OTHER PUBLICATIONS

Enikolopyan et al., Journal of Polymer Science, Polymer Chemistry Ed., vol. 19, pp. 879–889, (1981).
Smirnov et al., Polymer Sciences, USSR, vol. 23, pp. 2807–2816, (1981).
Pashchenko et al., Doklady Akademii Nauk SSSR, vol. 265, No. 4, pp. 889–892, (1982).
Takahashi et al., Bull. Chem. Soc. Jap., vol. 36, No. 5, pp. 622–623, (1963).

Primary Examiner—Edward J. Smith

[57] ABSTRACT

A process for preparing low molecular weight methacrylate polymer and copolymer with a pentacyanocobaltate(II) catalytic chain transfer agent is disclosed.

9 Claims, No Drawings

PENTACYANOCOBALTATE(II) CATALYTIC CHAIN TRANSFER AGENTS FOR MOLECULAR WEIGHT CONTROL IN FREE RADICAL POLYMERIZATION

CROSS-REFERENCE TO RELATED APPLICATIONS

This application is a continuation-in-part of copending and commonly-assigned U.S. Ser. No. 804,135 filed on Dec. 3, 1985, now abandoned.

BACKGROUND OF THE INVENTION

1. Field of the Invention

This invention relates to free radical polymerization processes employing chain transfer agents for controlling the molecular weight of polymer and copolymer produced.

2. Background of the Art

Techniques for controlling the molecular weight of polymer and copolymer with chain transfer agents are currently being developed. Problems associated with use of known chain transfer agents include undesirable odor, intense color, and broad molecular weight distribution in the resulting polymer. Improved chain transfer agents are of considerable interest to the chemical industry.

U.S. Pat. No. 2,383,425, issued to Stewart, discloses a class of complex compounds which are said to initiate and catalyze the polymerization of open-chain aliphatic conjugated dienes such as butadiene-1,3 either alone or in admixture with other copolymerizable materials. The complex compounds are defined as containing a central heavy atom and at least one nitrogen containing coordinating group connected to the heavy metal atom by a coordinating or secondary valence.

Enikolopyan et al., J. Poly. Sci., Polymer. Chem. Ed., 19: 879–889 (1981) disclose use of a cobalt complex of hematoporphyrin tetramethyl ether as catalysts for chain transfer to monomer. Each porphyrin molecule is said to cause not less than 2000 transfer reactions. Smirnov et al., Polymer Science, USSR, 23: 2807–2816 (1981) disclose the use of cobalt-porphyrin complexes as catalytic chain transfer agents for controlling molecular weight in the radical polymerization of styrene. Pashchenko et al., Doklady Akademii Nauk SSSR, 265(4): 889–892 (1982) disclose the use of a cobalt complex of etioporphyrin-I as a catalytic chain transfer agent for radical polymerization of methyl methacrylate. It has been found that one disadvantage of cobalt-porphyrin complexes is an intense color in resulting polymer.

U.S. Pat. No. 4,526,945, issued to Carlson and Abbey, disclose a process for the preparation of low molecular weight methacrylate polymers and copolymers. Methacrylate monomers and lower amounts of other ethylenically unsaturated monomers are polymerized in the presence of an azo or similar free radical catalyst in conjunction with between about 0.0001% and 0.01% by weight dimethylglyoxime pyridine complex of Cobalt-(II). The resulting polymer exhibits controlled low molecular weight on the order of 500–20,000 as compared to about 100,000 in the absence of the cobalt(II) complex. The polymer is described as having improved color.

Takahashi et al., Bull. Chem. Soc. Jap., 36: 622–623 (1963) disclose the use of a cobalt cyanide complex in the presence of hydrogen as an initiator for the polymerization of methyl methacrylate, styrene, acrylonitrile, and butadiene.

SUMMARY OF THE INVENTION

The present invention provides a process for free radical polymerization of unsaturated monomer wherein molecular weight control is effected by means of a catalytic chain transfer agent. The process comprises contacting unsaturated monomer comprising methacrylate monomer with a catalytically effective amount of a free radical initiator in the presence of a pentacyanocobaltate(II) catalytic chain transfer agent. The catalytic chain transfer agent has the formula,

$M_3Co(CN)_5$ wherein
  M is selected from the group consisting of $Li^+$, $Na^+$, $K^+$, $NH_4^+$, and $R_4N^+$;
  R is $C_xH_{2x+1}$; and
  x is an integer from 1 to 10, inclusive.

Preferably, the catalytic chain transfer agent is present in a concentration of from about $1.0 \times 10^{-6}$ to about $7.7 \times 10^{-4}$ M.

DETAILED DESCRIPTION OF THE INVENTION

This invention provides a process for free radical polymerization of methacrylate monomer wherein molecular weight control is effected by means of a pentacyanocobaltate(II) catalytic chain transfer agent. In addition to molecular weight control, the present process can be used to narrow molecular weight distribution in the resulting polymer. Control of molecular weight and the distribution thereof permits one to produce polymer or copolymer with useful physical properties, such as glass transition temperature, hardness, heat distortion temperature, and viscosity. For example, the present process can be used to produce polymer or copolymer with low viscosity which is useful for preparing coatings and films. Additionally, the process produces polymer or copolymer with very little color which is useful for paints and finishes.

Polymer or copolymer produced by the present process contains unsaturated end groups. Such polymer or copolymer is referred to herein as "macromonomer". It has been found that macromonomer prepared in accordance with the present invention can be polymerized or copolymerized to form polymer or copolymer with desirable physical properties, such as high tensile strength, low viscosity, improved crystallinity and clarity. Macromonomers having from about 10 to about 1,000 units are preferred for paints and finishes, and most preferably, from about 100 to about 500 units.

In the process of the present invention, polymerization is conducted by contacting unsaturated monomer with a catalytically effective amount of a free radical initiator in the presence of a pentacyanocobaltate(II) catalytic chain transfer agent. Suitable pentacyanocobaltate(II) catalytic chain transfer agent have the formula,

$M_3Co(CN)_5$ wherein
  M is selected from the group consisting of $Li^+$, $Na^+$, $K^+$, $NH_4^+$, $R_4N^+$;
  R is $C_xH_{2x+1}$ or $C_6H_5$; and x is an integer from 1 to 10, inclusive.

Preferably, M is K+. These catalytic chain transfer agents can be prepared by combining anhydrous cobalt-(II) chloride with an appropriate cyanide in methanol. The preparation and isolation of potassium pentacyanocobaltates(II) are disclosed in Adamson, *J. Am. Chem. Soc.*, 73: 5710-5713 (1951), the disclosure of which is incorporated herein by reference. Preferably, the pentacyanocobaltate(II) catalytic chain transfer agent is present in a concentration of from about $1.0 \times 10^{-6}$ to about $7.7 \times 10^{-4}$M, and most preferably from about $1.0 \times 10^{-5}$ to about $7.0 \times 10^{-4}$M.

In free radical polymerizations, the molecular weight of the polymer product will depend on several factors, including:

1. the monomer/initiator molar ratio (M/I);
2. the boiling point of the reaction medium;
3. the inherent chain transfer activity of the solvent; and
4. the relative rates of initiation and propagation.

In the present invention, other factors, such as the relative activity of the chain transfer agent and the chain transfer agent/initiator molar ratio are also important. It has been found that the concentration of pentacyanocobaltate(II) catalytic chain transfer agent determines the molecular weight of the resulting polymer or copolymer.

The process of the present invention is carried out most effectively with methacrylate monomer, but styrene and acrylate monomer can be included as comonomers with the methacrylate monomer without diminution of the advantage of the invention process. Suitable methacrylate monomers are generically described by the following formula:

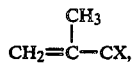

wherein X is COOR or CN, and R is a moiety not interfering with the catalytic chain transfer activity of the pentacyanocobaltate(II) catalytic chain transfer agent. Preferably, R is at least one moiety selected from the group consisting of $C_6H_5$, allyl, glycidal, hydroxyalkyl, allyloxyethyl, 2,4-hexadienyl, dialkyl aminoalkyl, and $C_zH_{2z+1}$, where z is an integer from 1 to 12, inclusive. Preferably, the unsaturated monomer contains at least about 50 mole percent methacrylate monomer.

The process of the present invention is conducted in a solvent which is compatible with and capable of dissolving the selected monomer, initiator, and pentacyanocobaltate(II) catalytic chain transfer agent. A partial list of suitable solvents includes aromatic hydrocarbons like benzene, toluene, and xylene; ethers like tetrahydrofuran and diethyl ether; ketones like acetone, butanone, pentanone, and hexanone; and alcohols like methanol, ethanol, propanol, and butanol. Preferably the solvent has a boiling point of from about 35° to about 145° C. Most preferably, the solvent is methanol. In some instances, it may be advantageous to use mixtures of two or more solvents.

Suitable free radical initiators are capable of initiating the polymerization of selected unsaturated monomer. Any of the known class of azo polymerization initiators is suitable provided it has requisite solubility in the solvent or monomer mixture chosen and has an appropriate half-life at the temperature of polymerization. Preferably, the initiator is an azo compound selected from the group consisting of azodiisobutyronitrile, dimethylazodiisobutyrate, and 2,2'-azobis-[2-methyl]butanenitrile, most preferably 2,2'-azobis[2-methyl]butanenitrile.

The process of the invention generally is carried out in batch mode in accordance with techniques which are well known to one skilled in the art. Such techniques are demonstrated in the Examples. Batch polymerization can be conducted by charging selected monomer, solvent, chain transfer agent and initiator to a nitrogen flushed reactor and heating under a nitrogen flow. Preferably, the process of the present invention is conducted at a temperature of from about 35° to about 145° C., and most preferably at the reflux temperature of the solvent. Preferably, the chain transfer agent/initiator molar ratio is in the range 0.0006-0.154. In a preferred embodiment, polymerization is conducted in the absence of molecular oxygen under an inert atmosphere such as nitrogen, argon or other non-oxidizing gas.

Upon completion of polymerization the polymer is isolated by stripping off solvent and unreacted monomer or by precipitation with a nonsolvent. Alternatively, the polymer solution can be used as such if appropriate to its application.

The invention is further described by the following Examples, wherein all parts and percentages are by weight and degrees are Celcius. In the Examples number average molecular weight (Mn), weight average molecular weight (Mw), and peak fraction molecular weight (peak Mw) were determined by gel permeation chromotography.

EXAMPLES 1-3 AND COMPARATIVE EXPERIMENT A

Potassium Pentacyanocobaltate(II) as a Catalytic Chain Transfer Agent in Free Radical Polymerization of Methyl Methacrylate A potassium pentacyanocobaltate(II) catalytic chain transfer agent was prepared according to the following procedure. 0.050 g ($3.85 \times 10^{-3}$ mole) of anhydrous cobalt(II) chloride and 0.150 g ($2.3 \times 10^{-3}$ mole) of potassium cyanide were added to 50 mL of methanol. The resulting mixture was stirred continuously for about 16 hours and then 200 mL of methanol were added to the mixture. The resulting solution was filtered and analyzed by ultraviolet spectroscopy. The concentration of $K_3[Co(CN)_5]$ was $1.5 \times 10^{-4}$ molar.

Methyl methacrylate was sparged with nitrogen and passed through a column of grade 1 alumina. 10.72 mL (0.1 mole) of the resulting methyl methacrylate and the amount of potassium pentacyanocobaltate(II) catalyst shown in Table I as catalytic chain transfer agent were added to a 100 mL of methanol. The resulting combination and 0.124 g ($5.0 \times 10^{-4}$ mole) of 2,2'-azobis[2-methyl]butanenitrile initiator were added to a 300 mL round bottom flask in the nitrogen dry box. The resulting mixture was stirred to dissolve the initiator and a 1 mL sample of the mixture was removed for gas liquid phase chromatography (glpc) analysis. The round bottom flask was capped with a water cooled condenser and removed from the nitrogen dry box. The mixture was heated at reflux under a nitrogen atmosphere for 6 hours and cooled to ambient temperature. A 1 mL sample of the resulting mixture was removed for glpc analysis. Precipitated polymer was collected by filtration and washed. The results are shown in Table I. The percent reaction shown in Table I was determined based on glpc analysis of the 1 mL samples removed before and after heating at reflux.

TABLE 1

| Comp. Exp. or Ex. | $[K_3Co(CN)_5]$ | Mn | Mw | Mw/Mn | Reaction | Polymer Yield (g) |
|---|---|---|---|---|---|---|
| A | 0 | 17,100 | 29,000 | 1.69 | 65% | 6.421 |
| 1 | $3.0 \times 10^{-6}$ M | 13,500 | 26,500 | 1.96 | 65% | 7.170 |
| 2 | $1.5 \times 10^{-5}$ M | 12,400 | 24,200 | 1.95 | 63% | 6.133 |
| 3 | $7.5 \times 10^{-5}$ M | 9,350 | 17,000 | 1.82 | 41% | 2,966 |

EXAMPLES 4-5 AND COMPARATIVE EXPERIMENT B

Potassium Pentacyanocobaltate(II) as a Catalytic Chain Transfer Agent in Free Radical Copolymerization of Methyl Methacrylate and Styrene 10.72 mL (0.1 mole) of methyl methacrylate and 11.5 mL (0.1 mole) of styrene were copolymerized according to a method similar to that described in Example 1. The results are shown in Table II.

TABLE II

| Ex. | Comp. Exp. | $[K_3CO(CN)_5]$ | Mn | Mw | Mw/Mn |
|---|---|---|---|---|---|
| | B | 0 | 18,100 | 36,400 | 2.01 |
| 4 | | $1.5 \times 10^{-4}$ M | 16,100 | 25,900 | 1.61 |
| 5 | | $7.7 \times 10^{-4}$ M | 15,600 | 25,900 | 1.66 |

INDUSTRIAL APPLICABILITY

Macromonomers prepared by the present method can be polymerized or copolymerized to produce graft polymers which are useful in coating and molding resins. Other potential uses include cast, blown, spun or sprayed applications in fiber, film, sheet, composite materials, multilayer coatings, photopolymerizable materials, photoresists, surface active agents including soil repellants and phsiological surfaces, adhesives, adhesion promoters and coupling agents. End products taking advantage of available characteristics include laquers, enamels, electrocoat finishes, high solid finishes, aqueous or solvent based finishes, clear or filled acrylic sheet or castings, including automotive and architectural glazing and illumination housings and refractors, additives for oil and fuel, including antimisting agents, outdoor and indoor graphics including signs billboards and traffic control devices, reprographic products and others.

What is claimed is:

1. A process for free radical polymerization of unsaturated monomer wherein molecular weight control is effected by means of a catalytic chain transfer agent, comprising:

contacting unsaturated monomer comprising methacrylate monomer with a catalytically effective amount of a free radical initiator in the presence of a pentacyanocobaltate(II) catalytic chain transfer agent having the formula $$M_3Co(CN)_5$$

wherein

M is selected from the group consisting of Li$^+$, Na$^+$, K$^+$, NH$_4^+$, R$_4$N$^+$;

R is C$_x$H$_{2x+1}$ or C$_6$H$_5$; and x is an integer from 1 to 10, inclusive.

2. A process as defined in claim 1, wherein the pentacyanocobaltate(II) catalytic chain transfer agent is present in a concentration of from about $1.0 \times 10^{-6}$ to about $7.7 \times 10^{-4}$ M.

3. A process as defined in claim 2, wherein the pentacyanocobaltate(II) chain transfer agent is present in a concentration of from about $1.0 \times 10^{-5}$ to about $7.0 \times 10^{-4}$ M.

4. A process as defined in claim 3, wherein M is K$^+$.

5. A process as defined in claim 4, wherein the unsaturated monomer contains at least about 50 mole percent methacrylate monomer.

6. A process as defined in claim 5, wherein the process is conducted in the absence of molecular oxygen.

7. A process as defined in claim 4, wherein the unsaturated monomer comprises a methacrylate monomer having the formula $$CH_2=\underset{\underset{X,}{|}}{\overset{\overset{CH_3}{|}}{C}}$$

wherein X is COOR or CN, and R is a moiety selected from the group consisting of C$_6$H$_5$, allyl, glycidal, hydroxyalkyl, allyloxyethyl, 2,4-hexadienyl, dialkyl aminoalkyl, and C$_z$H$_{2z+1}$, where z is an integer from 1 to 12, inclusive.

8. A process as defined in claim 7, wherein the unsaturated monomer contains at least about 50 mole percent methacrylate monomer.

9. A process as defined in claim 8, wherein the process is conducted in the absence of molecular oxygen.

* * * * *